United States Patent
O'Toole

(10) Patent No.: US 11,101,689 B2
(45) Date of Patent: Aug. 24, 2021

(54) SYSTEMS AND METHODS FOR PROVIDING NETWORK CONNECTION RESILIENCY IN POWER SUPPLY DEVICES

(71) Applicant: SCHNEIDER ELECTRIC IT CORPORATION, Foxboro, MA (US)

(72) Inventor: Peter J. O'Toole, Galway (IE)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/488,161

(22) PCT Filed: Jul. 2, 2019

(86) PCT No.: PCT/US2019/040280
§ 371 (c)(1),
(2) Date: Aug. 22, 2019

(87) PCT Pub. No.: WO2020/010071
PCT Pub. Date: Jan. 9, 2020

(65) Prior Publication Data
US 2020/0358308 A1    Nov. 12, 2020

Related U.S. Application Data

(60) Provisional application No. 62/693,718, filed on Jul. 3, 2018.

(51) Int. Cl.
*H02J 9/06* (2006.01)
*H02J 13/00* (2006.01)
*H04L 12/66* (2006.01)

(52) U.S. Cl.
CPC .............. *H02J 9/062* (2013.01); *H02J 9/061* (2013.01); *H02J 13/00006* (2020.01); *H04L 12/66* (2013.01)

(58) Field of Classification Search
CPC ...... H02J 9/062; H02J 13/00006; H02J 9/061; H04L 12/66
See application file for complete search history.

(56) References Cited

U.S. PATENT DOCUMENTS

| | | | |
|---|---|---|---|
| 9,313,800 B2* | 4/2016 | Luoma | H04W 72/1242 |
| 2009/0189451 A1* | 7/2009 | Roepke | G06F 1/30 |
| | | | 307/66 |
| 2016/0249439 A1* | 8/2016 | Recker | H05B 45/00 |

FOREIGN PATENT DOCUMENTS

| | | | | |
|---|---|---|---|---|
| EP | 3035738 B1 * | 6/2016 | | H04W 48/10 |
| WO | 2009036185 A1 | 3/2009 | | |

OTHER PUBLICATIONS

Notification of Transmittal of the International Search Report and the Written Opinion of the Internationl Searching Authority from corresponding PCT/US2019/040280 dated Oct. 24, 2019.

* cited by examiner

*Primary Examiner* — Jared Fureman
*Assistant Examiner* — Duc M Pham
(74) *Attorney, Agent, or Firm* — Lando & Anastasi, LLP

(57) ABSTRACT

Power systems, devices, and methods include a plurality of network interfaces for providing communication to, e.g., a management server, console, or user interface. One or more controllers coupled to power circuitry determine whether a preferred one of the network interfaces has connectivity, and directs communication over the preferred network interface in response to a determination that the preferred network interface does have connectivity. The controller directs communication over an alternate one of the network interfaces in response to a determination that the preferred network interface does not have connectivity.

19 Claims, 14 Drawing Sheets

| Network Connection | Network Connection Type | Network Connection Bandwidth | Available UPS Data | Available Data Security | Data Set Profile |
|---|---|---|---|---|---|
| Network Connection A | T1 | 10Gbps | All Available UPS Data | All encryption algorithms | Data Set A |
| Network Connection B | 4G | 50Mbps | All Available UPS Data | 128 bit encryption algorithms | Data Set B |
| Network Connection C | WiFi | 22Mbps | Reduced UPS data | 64 bit encryption algorithms | Data Set C |
| Network Connection D | Dial Up | 2400bps | Heartbeat | None | Data Set D |

| Network Connection N | Satellite | 10Mbps | Heartbeat and Serial Number | None | Data Set X |
|---|---|---|---|---|---|

FIG. 9A

SYSTEMS AND METHODS FOR PROVIDING NETWORK CONNECTION RESILIENCY IN POWER SUPPLY DEVICES

CROSS-REFERENCE TO RELATED APPLICATION

This application is a U.S. National Stage Application under 35 U.S.C. § 371 of International Application No. PCT/US2019/040280, filed Jul. 2, 2019, titled SYSTEMS AND METHODS FOR PROVIDING NETWORK CONNECTION RESILIENCY IN POWER SUPPLY DEVICES, which claims the benefit under 35 U.S.C. § 119(e) of U.S. Provisional Application No. 62/693,718, filed Jul. 3, 2018, titled NETWORK CONNECTION RESILIENCY IN POWER SUPPLY DEVICES, both of which are hereby incorporated by reference in their entirety for all purposes.

BACKGROUND OF INVENTION

Field of the Invention

At least one example in accordance with the present invention relates generally to providing reliable network connectivity to devices such as uninterruptible power supply systems, power distribution units, and environmental control and monitoring systems.

Discussion of Related Art

Environmental and power provisioning systems are increasingly connected to networks for local and remote management purposes. For example, heating, ventilation, and air conditioning (HVAC) systems, uninterruptible power supply (UPS) systems, and power distribution unit (PDU) systems are increasingly provided with and rely upon a network connection to remote management devices and/or user interfaces for configuration, reporting, alarm notification, etc. Failure of a network connection may cause such systems to be un-managed for a time, may prevent them from reporting events to a central system, and may prevent management control messages from being effective. Reliable network connectivity may contribute to various benefits, including reduced downtime, enhanced system management, and lower costs of operation.

SUMMARY

Aspects and embodiments are generally directed to intelligent power distribution and storage systems and methods, including for the delivery of reliable power by provision of batteries or other energy storage components, such as an uninterruptible power supply. Examples of the aspects and embodiments discussed herein address reliable network connectivity, and in particular the provision of redundant network connections for UPS systems that may be prioritized for automated resilient communication with other systems.

According to one aspect, an uninterruptible power supply is provided that includes a first input configured to receive input power, a second input configured to receive backup power, an output configured to provide output power to a load, power circuitry coupled to the first input, the second input and the output, and configured to provide the output power derived from at least one of the input power or the backup power, a plurality of network interfaces, one or more controllers coupled to the power circuitry and the plurality of network interfaces, one or more controllers configured to direct communication over the network via a preferred network interface in response to a determination that the preferred network interface does have connectivity to the network, and one or more controllers configured to direct communication over the network via an alternate one of the plurality of network interfaces in response to a determination that the preferred network interface does not have connectivity to the network.

According to some embodiments, at least one controller is configured to determine connectivity to the network by attempting to communicate with a management device. In certain embodiments, at least one controller is configured to determine connectivity to the network by intervally sending keep-alive messages to a management device.

In some embodiments, at least one controller is further configured to detect a type of network connection coupled to one or more of the plurality of network interfaces and to determine the preferred network interface based upon the type of network connection. In various embodiments, at least one controller may be configured to determine the preferred network interface based upon an ordered list including a wired connection, a wireless connection to a local area network, and a wireless connection to a cellular network.

In certain embodiments, at least one controller is configured to disallow a set of remote management capabilities based upon an untrusted status of one of the plurality of network interfaces the controller uses to communicate with the network. In some embodiments, at least one controller may be configured to determine an untrusted status of the one of the plurality of network interfaces based upon at least one of a detected type of network connection coupled to the one of the plurality of network interfaces, a user-configured type of network connection coupled to the one of the plurality of network interfaces, or a user-configured untrusted status of the one of the plurality of network interfaces.

In various embodiments, at least one controller may be configured to accept a user configuration identifying at least one of a preferred network interface or a preferred type of network connection coupled to one or more of the plurality of network interfaces.

In some embodiments, at least one controller is configured to determine connectivity to the network via one or more alternate network interfaces of the plurality of network interfaces while directing communication over the network via the preferred network interface. In various embodiments, at least one controller may be configured to output an alert in response to determining that one or more of the plurality of network interfaces does not have connectivity to the network.

According to another aspect, a network interface adapter is provided that includes a first sub-interface configured to be coupled to a first network connection, a second sub-interface configured to be coupled to a second network connection, a local device interface configured to be coupled to a power controller, and a processor configured to determine whether the first sub-interface has connectivity to a remote device, to provide communications between the controller and the remote device via the first sub-interface in response to a determination that the first sub-interface does have connectivity to the remote device, to determine whether the second sub-interface has connectivity to a remote device, and to provide communications between the controller and the remote device via the second sub-interface in response to a determination that the first sub-interface does not have connectivity to the remote device and that the second sub-interface does have connectivity to the remote device.

In various embodiments, the processor is further configured to associate a first preference with the first sub-interface, and associate a second preference with the second sub-interface, wherein the first preference is more preferred than the second preference.

Some embodiments include a third sub-interface configured to be coupled to a third network connection, the processor being further configured to associate a preference with each of the first sub-interface, the second sub-interface, and the third sub-interface, and to provide communications between the controller and the remote device via a highest preferred one of the sub-interfaces that has connectivity to the remote device. In certain embodiments, the processor is further configured to detect a type of network connection coupled to one or more of the sub-interfaces and to associate the preference based upon the type of network connection. In some embodiments the processor may be configured to associate the preference based upon an ordered list including a wired connection, a wireless connection to a local area network, and a wireless connection to a cellular network.

In certain embodiments, the processor is configured to disallow a set of remote management capabilities in response to a determination that the first sub-interface does not have connectivity to the remote device.

In various embodiments, the processor is further configured to accept a user configuration including at least one of identifying which sub-interface is the first sub-interface, associating a preference with any of the sub-interfaces, identifying a type of network connection coupled to any of the sub-interfaces, associating a cost of use of any of the sub-interfaces, or establishing a trusted status of any of the sub-interfaces.

In some embodiments, the processor is configured to determine whether the second sub-interface and the third sub-interface have connectivity to the remote device while communicating with the remote device via the first sub-network. In various embodiments, the processor may be further configured to output an alert in response to a determination that one or more of the first, second, and third interfaces does not have connectivity to the remote device.

According to another aspect, a non-transitory computer-readable medium storing thereon sequences of computer-executable instructions for providing communication between a power unit and a management device. The sequences of computer-executable instructions including instructions that instruct at least one processor to determine whether a first network interface has connectivity to the management device, communicate with the management device via the first network interface in response to a determination that the first network interface does have connectivity to the management device, determine whether a second network interface has connectivity to the management device, and communicate with the management device via the second network interface in response to a determination that the first network interface does not have connectivity to the management device and that the second network interface does have connectivity to the management device.

Some embodiments include instructions further configured to instruct the at least one processor to determine whether a third network interface has connectivity to the management device, and communicate with the management device via the third network interface in response to a determination that each of the first network interface and the second network interface does not have connectivity to the management device and the third network interface does have connectivity to the management device.

Various embodiments include instructions further configured to instruct the at least one processor to determine a type of network connection coupled to each network interface and identify the first network interface and the second network interface based upon the type of network connection, in certain embodiments, wherein in identifying the first network interface and the second network interface based upon the type of network connection, the instructions further instruct the at least one processor to identify a wired network connection as the first network interface over a wireless network connection as a second network interface and identify a shorter range wireless network connection as the first network interface over a longer range wireless network connection as a second network interface.

Various embodiments may include instructions further configured to instruct the at least one processor to alert a user in response to a determination that one or more of the first, second, and third network interfaces does not have connectivity to the management device.

According to another aspect, a method of providing communication between a power unit and a management device is provided. The method includes removing a first network adapter from the power unit, installing a second network adapter to the power unit, the second network adapter having a first network interface and a second network interface, and the second network adapter configured to monitor the first and second network interfaces for connectivity to the management device and to use a highest priority one of the first and second network interfaces determined to have connectivity to the management device for communications with the management device, coupling the first network interface to a first network connection, and coupling the second network interface to a second network connection.

Various embodiments may include assigning a type of network connection coupled to the first and second network interfaces and assigning a priority to the first and second network interfaces based upon the type of network.

Certain embodiments include configuring the second network adapter to assign priority to at least one of the first network interface and the second network interface.

Some embodiments include determining whether the second network interface has connectivity to the management device while using the first network interface to communicate with the management device.

Various embodiments may include determining whether the first network interface has connectivity to the management device while using the second network interface to communicate with the management device.

Certain embodiments may include alerting a user in response to a determination that at least one of the first and second network interfaces does not have connectivity to the management device.

Still other aspects, embodiments, examples, and advantages of these exemplary aspects and embodiments are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF DRAWINGS

Various aspects of at least one embodiment are discussed below with reference to the accompanying drawings, which are not intended to be drawn to scale. The drawings are included to provide illustration and a further understanding of the various aspects and embodiments, and are incorporated in and constitute a part of this specification, but are not intended as a definition of the limits of the disclosure. In the drawings, each identical or nearly identical component that is illustrated in various figures may be represented by a like numeral. For purposes of clarity, riot every component may be labeled in every drawing. In the drawings:

FIG. 9A is a chart illustrating one example of UPS data sets;

DETAILED DESCRIPTION

Systems and methods discussed herein are directed to uninterruptible power supplies having specialized accommodation for resilient network connectivity. The example uninterruptible power supplies discussed herein include network interfaces that incorporate multiple network connectivity options and select a best network connectivity at any given time, based upon availability of the network connection and a prioritization of which network connection(s) are preferred over others.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed there aft and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
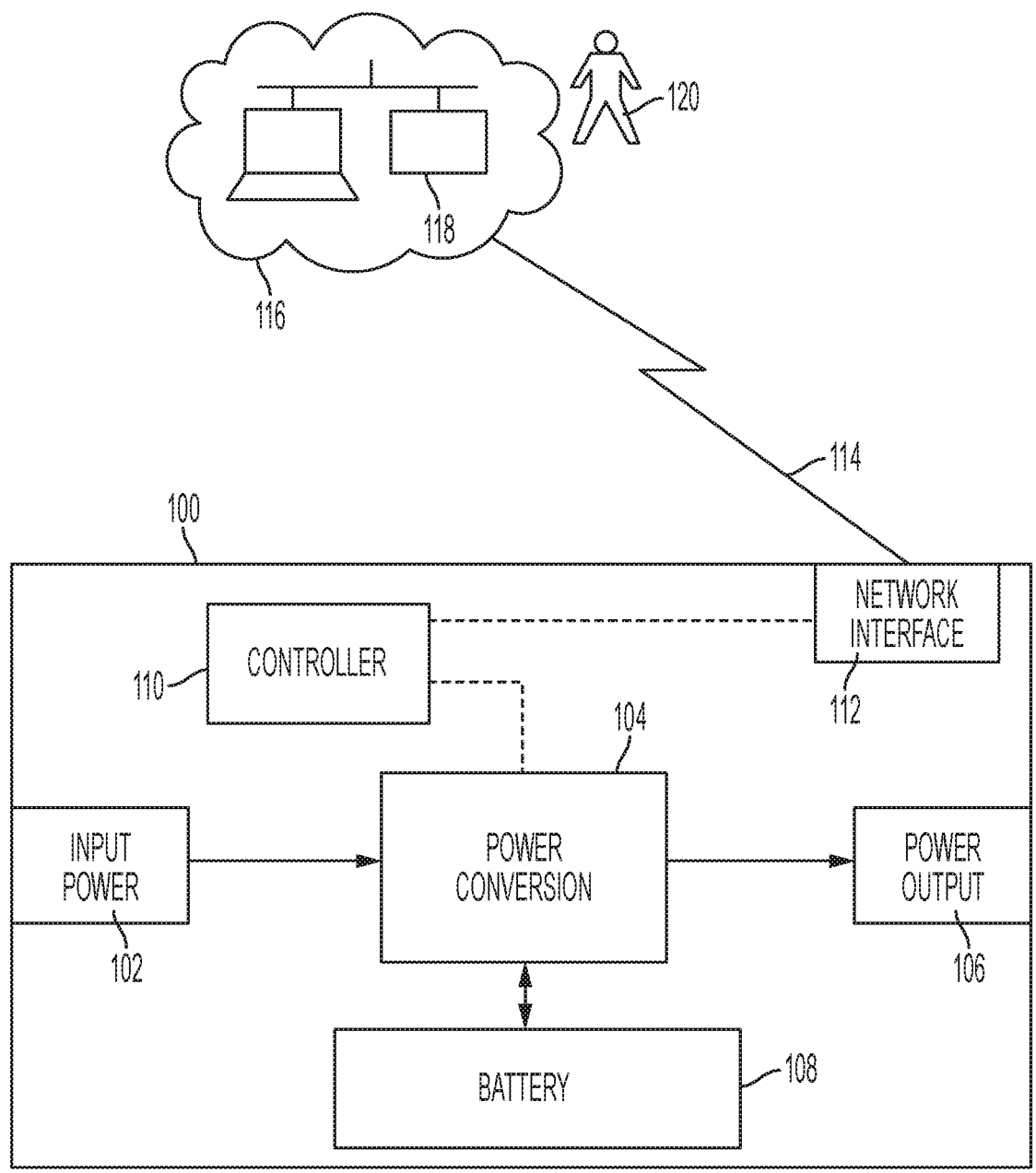
FIG. 1 is a block diagram of an example uninterruptible power supply (UPS) having a network interface.

Uninterruptible power supplies (UPS) are commonly used to provide regulated, uninterrupted power to sensitive and/or critical loads, or any load to which a reliable source of power is desired. FIG. 1 shows an example of a UPS 100 that includes an input 102 to receive power, a converter 104, and an output 106 to provide power to the load. A battery 108 or other energy storage component may be included to store energy, e.g., to be used in the event of a failure to receive power at the input 102. For example, the input 102 may be coupled to an electric utility grid to provide power, or may be connected to a power generator, such as a wind turbine, one or more solar cells, a fossil-fuel powered generator, etc. In some embodiments, multiple inputs 102 may be provided to accommodate numerous potential power sources. In various embodiments, multiple outputs 106 may be provided to power multiple loads. In at least one example, the input 102 accepts electrical power in an alternating current (AC) form, the power converter 104 converts the AC power to direct current (DC) form to charge and maintain the battery 108, and the power converter 104 converts DC power (from the battery 108 and/or from the conversion of AC at the input 102) into AC power to provide to the output 106. In various examples, the converter 104 may include multiple conversion components, such as an AC/DC converter and a DC/AC inverter, and may include switching circuitry, control circuitry, and/or battery management circuitry, as well as various other circuitries.

In various examples, the converter 104 may be controlled or managed by a controller 110, which may incorporate some of the conversion functionality, may be incorporated into the converter 104 in some examples, or may operate independently to monitor and/or manage various functions of the UPS 100. In some embodiments, the controller 110 may be one or more controllers including one or more components such as one or more processors.

The UPS 100 also includes a network interface 112 that allows a network connection 114 to a network 116, which provides a communication channel for the UPS 100 generally (or the controller 110 more specifically) to communicate with the network 116, and a management server 118 (or platform) and/or a user 120. In various examples, the network 116 may be a local network or a wide area network, and various management servers or management controllers may be coupled to the network 116 to provide management and reporting to and from the UPS 100, including, e.g., by local or remote user interfaces to the user 120, such as by a web interface. The network connection 114 may be, for example, an Ethernet connection, an IEEE 802.3 connection, or any connection in conformance with various standards or specifications, and the network 116 may be a local area network, or may be a more significant network infrastructure including multiple links, on a wide area scale, and may encompass network connectivity across a city, a country, a continent, or the globe. Accordingly, a management server 118 and/or a user 120 may be located anywhere desired, from which the network interface 112 and network connection 114 may provide management and configuration communication capability of the UPS 100.

In some examples, a failure of the network connection 114 may leave the UPS 100 in an un-managed state, incapable of receiving management or configuration messages, and incapable of responding or reporting status information. Further, a failure of any of numerous links may cause the network connection 114 to be interrupted. For example, an immediately connected link of the network interface 112 to a local network segment may fail, or a link further away may fail, such as a local router may lose an uplink to a broader network, in either case causing a failure of network connectivity of the UPS 100.

Systems and methods in accord with aspects and embodiment described herein, however, may provide resilient network connectivity by, e.g., detecting a failure of the network connection 114 and providing an alternate network connection.

Figure 2:
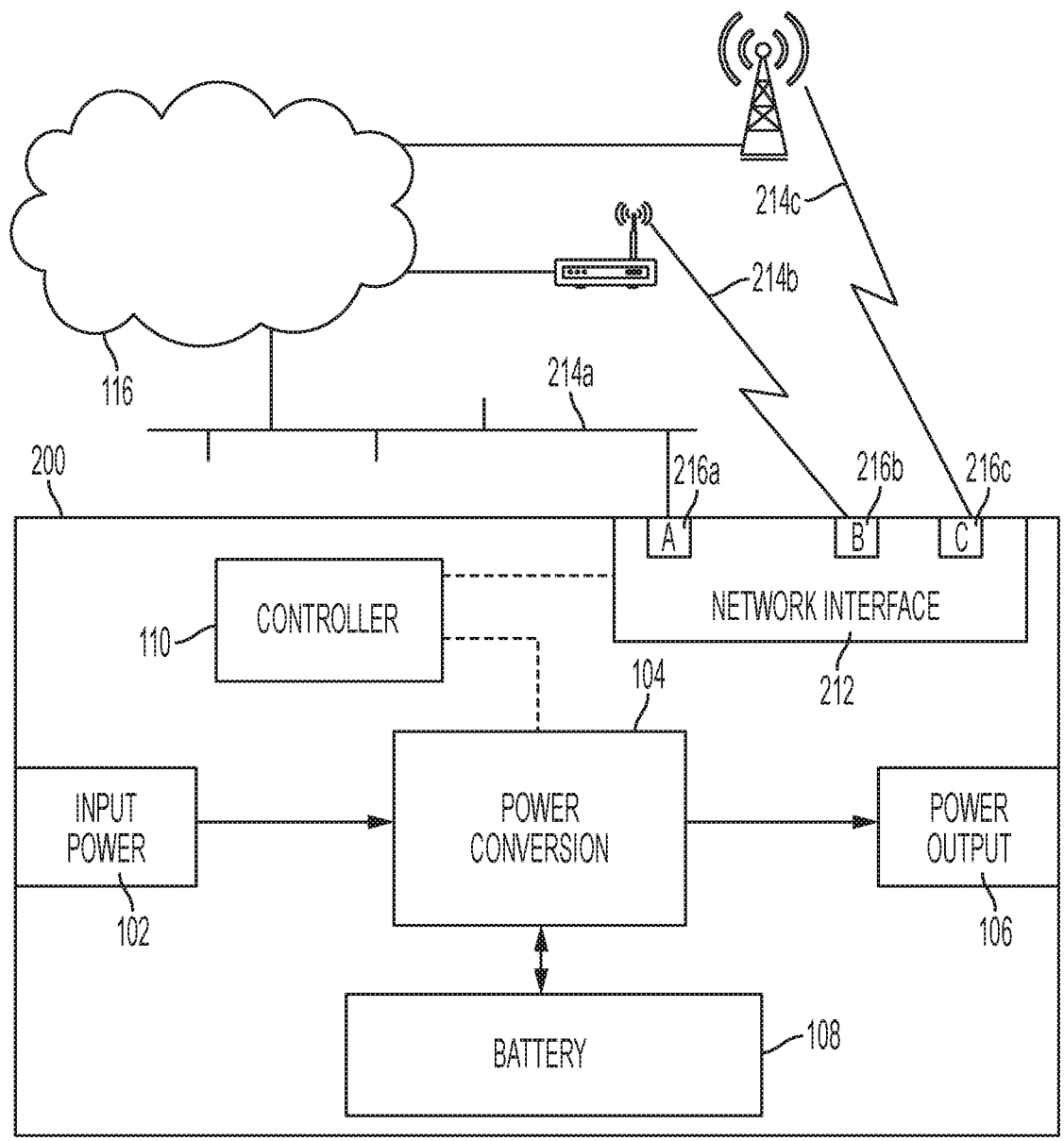
FIG. 2 is a block diagram of another example UPS having a network interface with resilient network connectivity.

FIG. 2 illustrates an example of a UPS 200 having resilient network connectivity. The UPS 200 is similar to the UPS 100 but includes a network interface 212 having capability of numerous network connections. In one embodiment, the network interface 212 may include multiple network sub-interfaces. In other embodiments, the network interface 212 may be a plurality of different network interfaces. In one example, network interface 212 includes three network sub-interfaces 216a, 216b, and 216c, each of which may have a respective network connection 214a, 214b, and 214c that may allow communication with the network 116. Various embodiments may include more or fewer sub-interfaces, and each sub-interface may be of a particular type (or in some embodiments, may accommodate multiple types of network connections), and may be wired or wireless. Various examples of connection types include, but are not limited to, Ethernet (e.g., IEEE 802.3), wireless LAN (e.g., IEEE 802.11), WiMAX, various cellular standards (mobile data, e.g., GSM/CDMA), etc.

In the example of FIG. 2, the network interface 212 may include a wired local area network connection 214a coupled to the first sub-interface 216a, a wireless local area network connection 214b coupled to the second sub-interface 216b, and a wireless cellular connection 214c coupled to the third sub-interface Accordingly, the first network connection 214a may involve a local Ethernet segment, the second network connection 214b may involve a wireless access point and/or wireless router, and the third network connection 214c may involve a cellular tower, for example. Each of the sub-interfaces 216 and network connections 214 may be of various types. While the above example included, in the example order of preference, a wired LAN, a wireless LAN, and a cellular connection, other examples may include various connection types in various orders of preference. For example, a first wired LAN may be the preferred connection to use, while a backup wired LAN may be second, and a wireless LAN may be third. Various embodiments may include more options via additional sub-interfaces. Some embodiments may include only two sub-interfaces. In various embodiments, each of the network connections 214 may be monitored by the network interface 212 for their connectivity to the network 116.

In various embodiments, a network interface 212 that includes a cellular or subscriber wireless interface capability may also include a receptacle or slot to accommodate a physical credential, such as a subscriber identity module (SIM) card. Various embodiments may include or accept other forms of credentials or identifying configuration capability (e.g., user names, passwords, encryption settings, etc.) to access or couple to a network connection.

As briefly described above, network connectivity to the network 116 may include additional links, devices, networks, etc., various of which may apply to any of the network connections 214, such that a failure of connectivity to the network 116 may be due to any of various failure points. For example, the network connection 214b, as shown coupled to a wireless access point, may experience a fault via such things as an access point failure, interference, or other interruption, but in other cases the network connection 214b may experience a fault (e.g., of connectivity to the network 116) by other links, devices, or networks causing a disconnection to the network 116. Accordingly, any of the network connections 214 could be operational yet not provide connectivity to the network 116, such that the network interface 212 may select another of the network connections 214 (e.g., via another of the network sub-interfaces 216) to reach the network 116.

Accordingly, the network interface 212 may monitor each of the network sub-interfaces 216 and/or each of the network connections 214, and/or connectivity to the network 116 via each sub-interface/connection pair. In various embodiments, the network interface 212 may monitor such connectivity by various means, such as by transmitting keep-alive packets of various protocols, such as a network or transport layer protocol (or other layers), maintaining a data link layer interaction with local equipment (e.g., with local routers for, e.g., address resolution protocol or dynamic host configuration protocol, etc.), monitoring physical layer characteristics (e.g., clocking and data signals on a wired or wireless interface, carrier sense, collision detection, etc.), monitoring for network traffic (e.g., wireless broadcasts, spanning tree protocol, etc.), or other means.

In various embodiments, active communications (e.g., management, reporting, etc.) between the UPS 200 and a user or a management console reachable through the network 116 may be limited to only one of the network connections 214 (e.g., a preferred connection) at a time. Accordingly, the network interface 212 may determine which of the sub-interfaces 216 is preferable for network communications. In some embodiments the network interface 212 may monitor each for network connectivity to the network 116, but use only the preferred one. In other embodiments, the network interface 212 may monitor only the preferred sub-interface, and use it so long as it is available, then monitor a secondary sub-interface for connectivity only when the preferred sub-interface loses connectivity or becomes unreliable, and so on to additional sub-interfaces in order of preference. In various embodiments, the sub-interfaces may be prioritized, e.g., to use sub-interface 216a whenever it has network connectivity, but to prefer sub-interface 216b during periods of time when the sub-interface 216a doesn't have reliable network connectivity, and to only use sub-interface 216c if each of the sub-interfaces 216a and 216b fail to have reliable network connectivity. Accordingly, a first, second, third, etc. preference for various sub-interfaces may be assigned.

In various embodiments, assignment of preference or priority for various sub-interfaces over other sub-interfaces may be pre-configured and/or may be configurable by a user. In some embodiments, sub-interface preferences may be user configurable but also include a default set of preferences. In some embodiments, sub-interface preferences may be based upon an expected or perceived level of security of the sub-interface type. For example, a wired connection may be considered more secure than a wireless connection. Further, a local wireless connection (e.g., a. wireless access point owned and operated by the same entity that owns and operates the UPS 200) may be considered more secure than a cellular wireless connection (e.g., a wireless connection having further physical reach to wireless connectivity equipment provided by a third party).

In some embodiments, the network interface 212 may be configured (or may be user configurable) to operate sub-interfaces and network connections of differing preference levels differently with respect to allowed communications. For example, the network interface 212 may allow full management, reporting, alarm indication, and the like, when connectivity is provided through the most preferred sub-interface, yet allow only critical alarm indications to be communicated when connectivity is provided through the least preferred sub-interface. Such configuration and/or settings may be user configurable and/or may be selected based upon an expected and/or perceived level of security of the various network connection types associated with a particular sub-interface. Network connection types may be automatically detected in some embodiments and/or may be user-configurable. Expected and/or perceived level of security may be pre-configured and/or may be user-configurable. In various embodiments, one or more sub-interfaces and/or network connection types may be user-configurable as being untrusted or having an untrusted status, e.g., to implement various limits on configuration management via the particular sub-interface and/or network connection type. Further to the example, the network interface 212 may allow a secondarily preferred sub-interface 216 (e.g., not the most preferred nor the least preferred) to receive some configuration management communications, but not others. For example, all configuration settings may be changeable when network connectivity is provided via a trusted or preferred sub-interface, while changeable (e.g., writable) configuration settings may be limited when network connectivity is provided via an untrusted or lesser preferred sub-interface. Accordingly, various ranges or levels of configuration access, reporting, and alarm notification may be configurable across various preference levels of sub-interfaces, types of network connections coupled to the sub-interfaces and/or status as trusted or untrusted, any of which may be pre-configured, user-configurable, and/or detected by a controller or processor. In some embodiments, control over ranges or levels of configuration access may be implemented by communication to the controller 110 (e.g., from the network interface 212) to be in a protected mode, for example, or may be implemented by the network interface 212 disallowing certain communications to/from the controller 110.

In some embodiments, a preference level and/or an amount of network communications allowed or disallowed (e.g., by the network interface 212 and/or by the controller 110 in cooperation with the network interface 212) may be based upon a cost of network usage and/or data rates on the various sub-interfaces. For example, a cellular mobile data network connection may cost more per amount of data (relative to lesser data or to other network connection types), and the network interface 212 (or the controller 110) may limit which network communications are allowed when communicating via the particular sub-interface that is connected such a cellular mobile data network. In some embodiments, network connectivity via a third party communications provider may be included in a price of such a network interface 212 or a UPS 200 that incorporates the network interface 212.

Figure 3A:
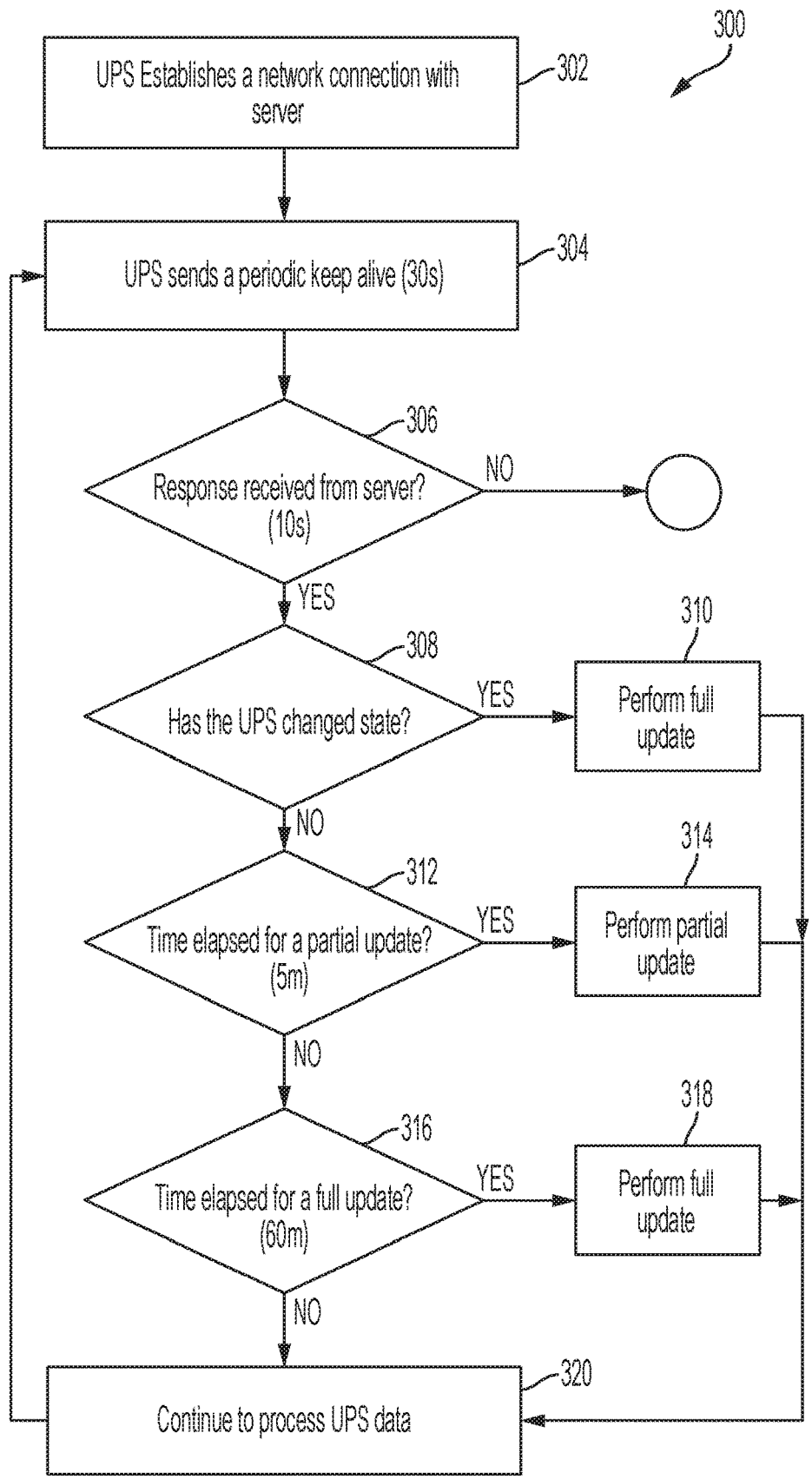
FIGS. 3A-3C is a flow chart illustrating one embodiment of a control process for a UPS communicating with a device.
Figure 3B:
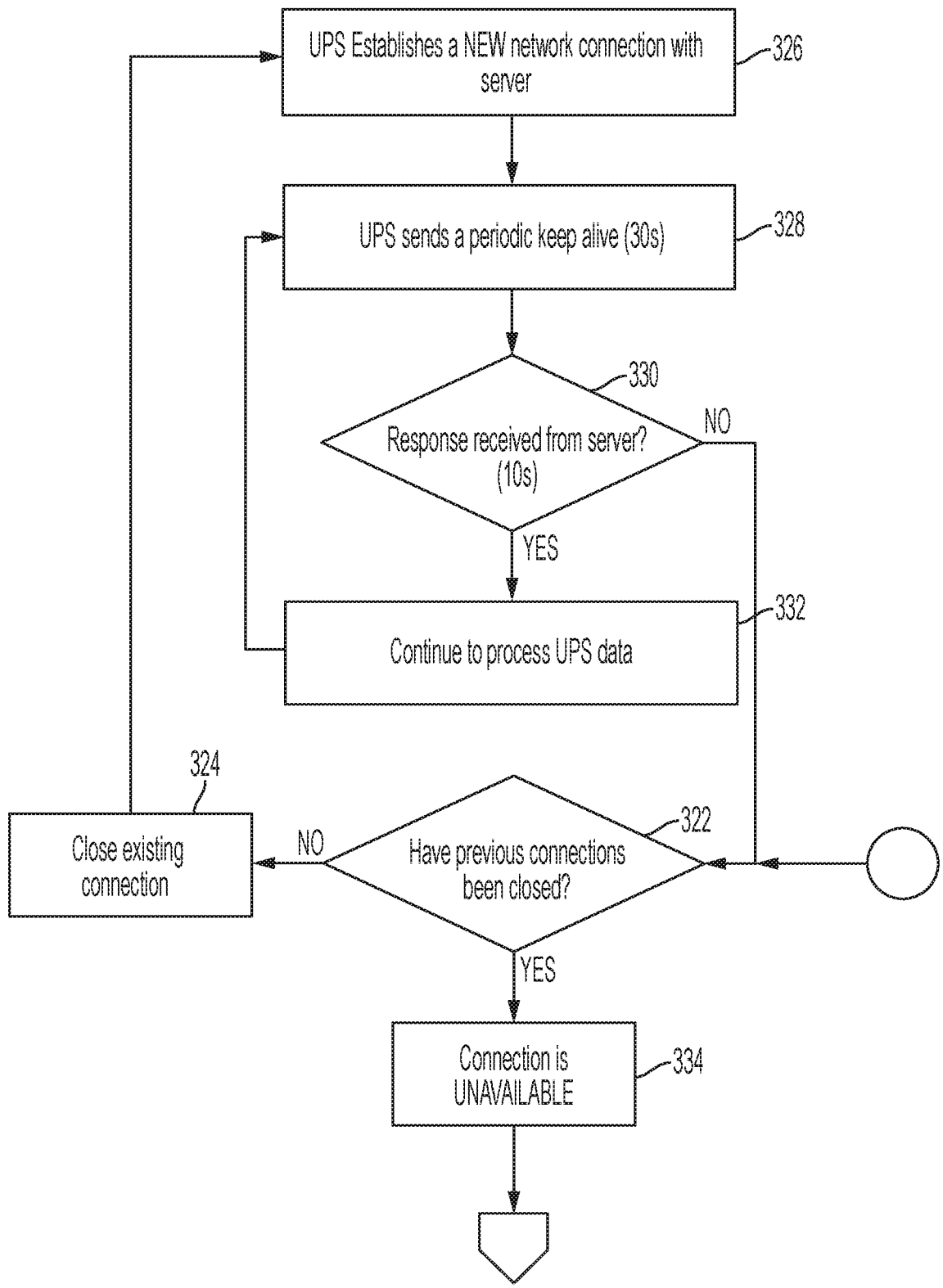
Figure 3C:
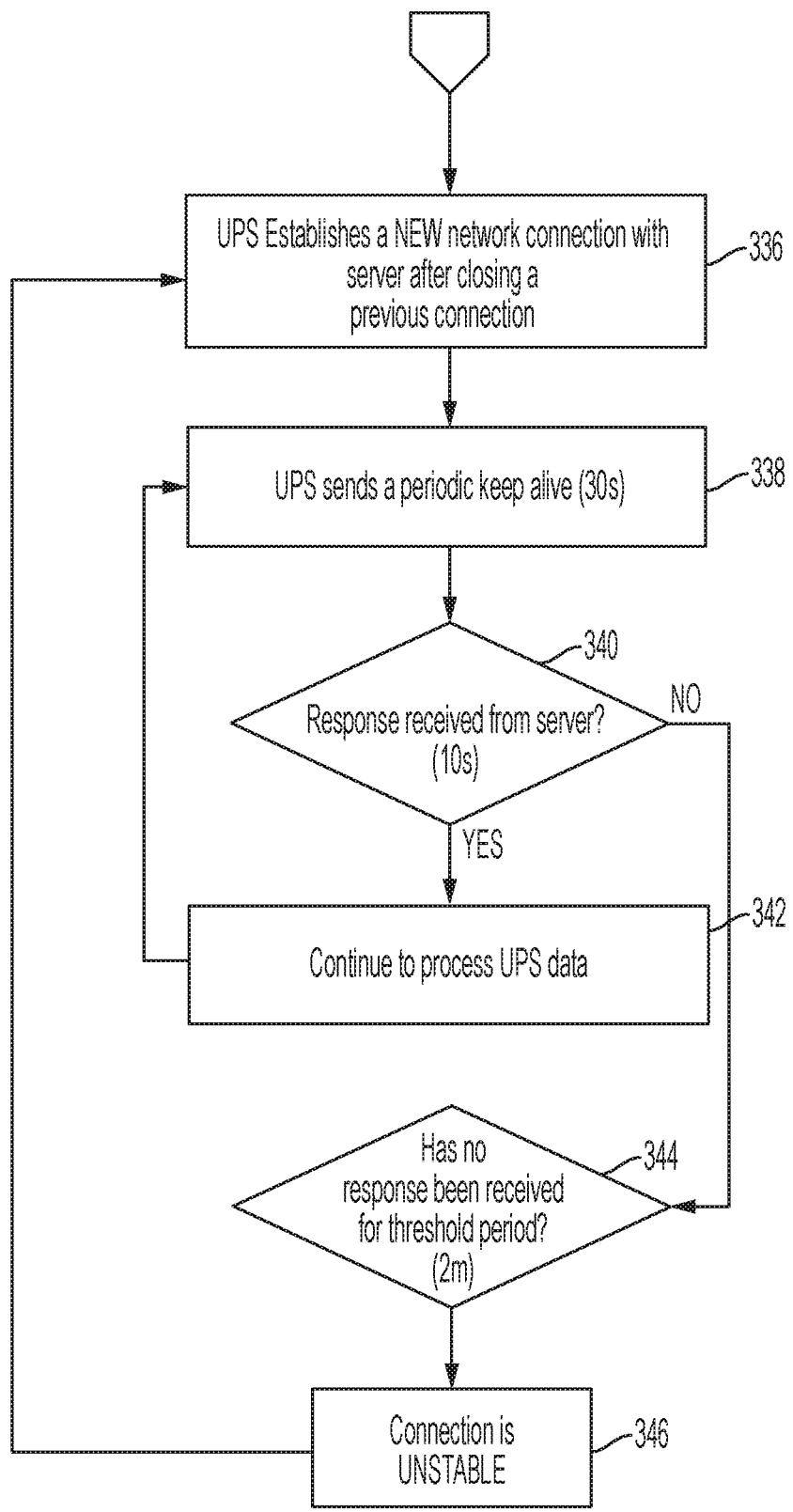

FIGS. 3A-3C illustrate a process 300 of controlling the network interface device 212 of UPS 200 to communicate with and report data to a cloud computing device, such as server 118. In some embodiments, the UPS 200 reports data to a monitoring and management system including a series or chain of servers. In the process 300, the network interface 212 of UPS 200 establishes a network connection to server 118 (block 302). In one embodiment, the network connection is established using TCP/IP. In some embodiments, the network connection is a basic socket connection. In other embodiments, the network connection includes the use of communication protocols such as CoAP, WebSockets, HTTPS, Socket.io, and SignalR.

After establishing the network connection, the network interface 212 sends a periodic keep-alive message to maintain the network connection (block 304). The keep-alive message is a minimally sized message requesting the server 118 to respond in acknowledgement of the receipt of the message. In one embodiment, the keep-alive message is sent every 10 seconds; however, the keep-alive message may be sent using any other time interval, including 30 seconds. The network interface 212 then checks for a response from the server 118 (block 306), in one embodiment, the network interface 212 waits 10 seconds for a response from the server 118; however, the network interface 212 may be configured to wait any other amount of time deemed appropriate.

If it is determined that a response from the server 118 to the keep-alive message has been received, the network interface 212 checks if an event has occurred resulting in a state change of the UPS 200 (block 308). In some embodiments, the UPS 200 may be configured to change states due to a loss of utility power and/or an overload condition. In response to a determination of a state change, the UPS 200 sends an immediate update to the server 118 (block 310), otherwise the network interface 212 checks if a partial update stored on the UPS 200 should be sent to the server 118 (block 312). In one embodiment, the partial update includes a data summary and is sent every 5 minutes; however, partial updates may be sent using any other time interval. In response to a determination that the partial update should be sent, the UPS 200 sends a partial update (block 314), otherwise the network interface 212 checks if a full update stored on the UPS 200 should be sent to the server 118 (block 316). In one embodiment, the full update includes a full data set and is sent every 60 minutes; however, full updates may be sent using any other time interval. In response to a determination that the full update should be sent, the UPS 200 sends a full update (block 318). In one embodiment, the network interface 212 may be configured to communicate with a controller, such as controller 110, to determine if the immediate, partial, and full updates should be sent. After either act 310, 314, 316, or 318, the UPS 200 continues to collect and process new data (block 320) and a new keep-alive message is sent (block 304).

If a determination is made that the server 118 did not respond to the keep-alive message (block 306), the network interface 212 checks if the network connection has been previously closed (block 322). If not, the network connection is closed (block 322), a new network connection with the server 118 is established (block 326), and another keep-alive message is sent to the server (block 328). If a response to the keep-alive message is received from the server 118 (block 330), the UPS 200 continues to collect and process new data (block 332) and a new keep-alive message is sent (block 328). If no response is received from the server 118 (block 330), and being that the network connection has been previously closed (block 322), the network connection is deemed to be unavailable (block 334).

In response to a determination that the network connection is unavailable, the network interface 212 again establishes a new network connection (block 336), and sends another keep-alive message to the server 118 (block 338). If a response to the keep-alive message is received from the server 118, the UPS 200 continues to collect and process new data (block 342) and a new keep-alive message is sent (block 338). If no response is received from the server 118 (block 340), the network interface 212 waits for a response from the server 118 for a threshold period (block 344). In one embodiment the threshold period is 2 minutes; however, the threshold period may be any other amount of time. If no response from the server 118 is received during the threshold period, the network connection is deemed to be unstable (block 346) and a new network connection with the server 118 is established (block 336).

In some embodiments, the UPS 200 may also establish network connections with the server 118 to receive commands. For example, the UPS may receive commands including UPS control, outlet control, alarms, configuration settings, firmware installations, etc.

According to at least one embodiment described herein, in addition to troubleshooting unavailable/unstable network connections by closing existing connections and establishing new connections, a network interface 212 may manage and utilize multiple network connections across different networks to maintain communication between the UPS 200 and the server 118.

Figure 4:
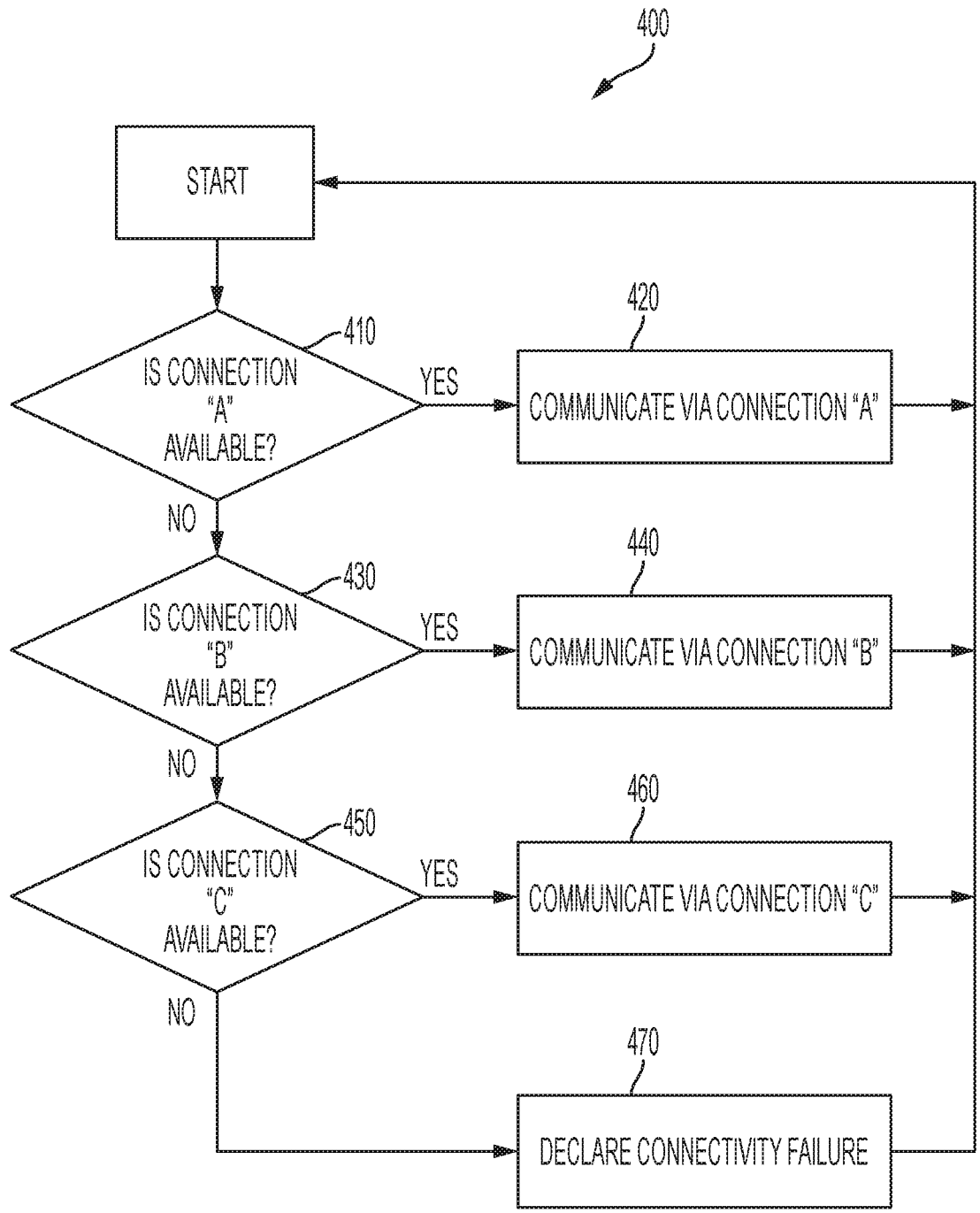
FIG. 4 is a flow chart illustrating one embodiment of a control process for a UPS having a network interface with resilient network connectivity.

FIG. 4 illustrates an example method 400 that may be implemented in a network interface 212 to manage multiple network connections in accord with aspects and embodiments herein. In the example method 400, the network interface 212 may monitor whether a first (most preferred) network connection "A" is available (block 410) and if so, may use network connection "A" to communicate with the network 116 (block 420). If the first network connection "A" is not available, the network interface 212 may monitor whether a second (less preferred) network connection "B" is available (block 430) and if so, use the network connection "B" to communicate with the network 116 (block 440). If the second network connection "B" is not available, the network interface 212 may monitor whether a third (least preferred) network connection "C" is available (block 450) and if so, may use the network connection "C" to communicate with the network 116 (block 460). If each of the network connections "A," "B," and "C" is not available, the network interface 212 may declare a connectivity failure (block 470) and return to monitoring "A," "B," and "C," e.g., at intervals, with optional delays, counters, timeouts, max iterations, etc. As further illustrated by the example method 400, when a particular network connection "A," "B," or "C" is available and used, the method 400 continues to check whether a more preferred network connection becomes available.

In some embodiments, the network connections "A," "B," and "C" may correspond to the network connections 214a, 214b, and 214c, and the sub-interfaces 216a, 216b, and 216c, respectively. In other embodiments, the network connections "A," "B," and "C" along with their corresponding preference/priority may be pre-configured in a different manner, may be user configurable, and/or may be dynamically configured or assigned to the various sub-interfaces 216 (and accordant network connections 214). For example, a network connection type may be detected and a preference or priority of one network connection over another may be assigned based upon the type. Various embodiments may include more or fewer network connections with varying orders of preference.

Figure 5:
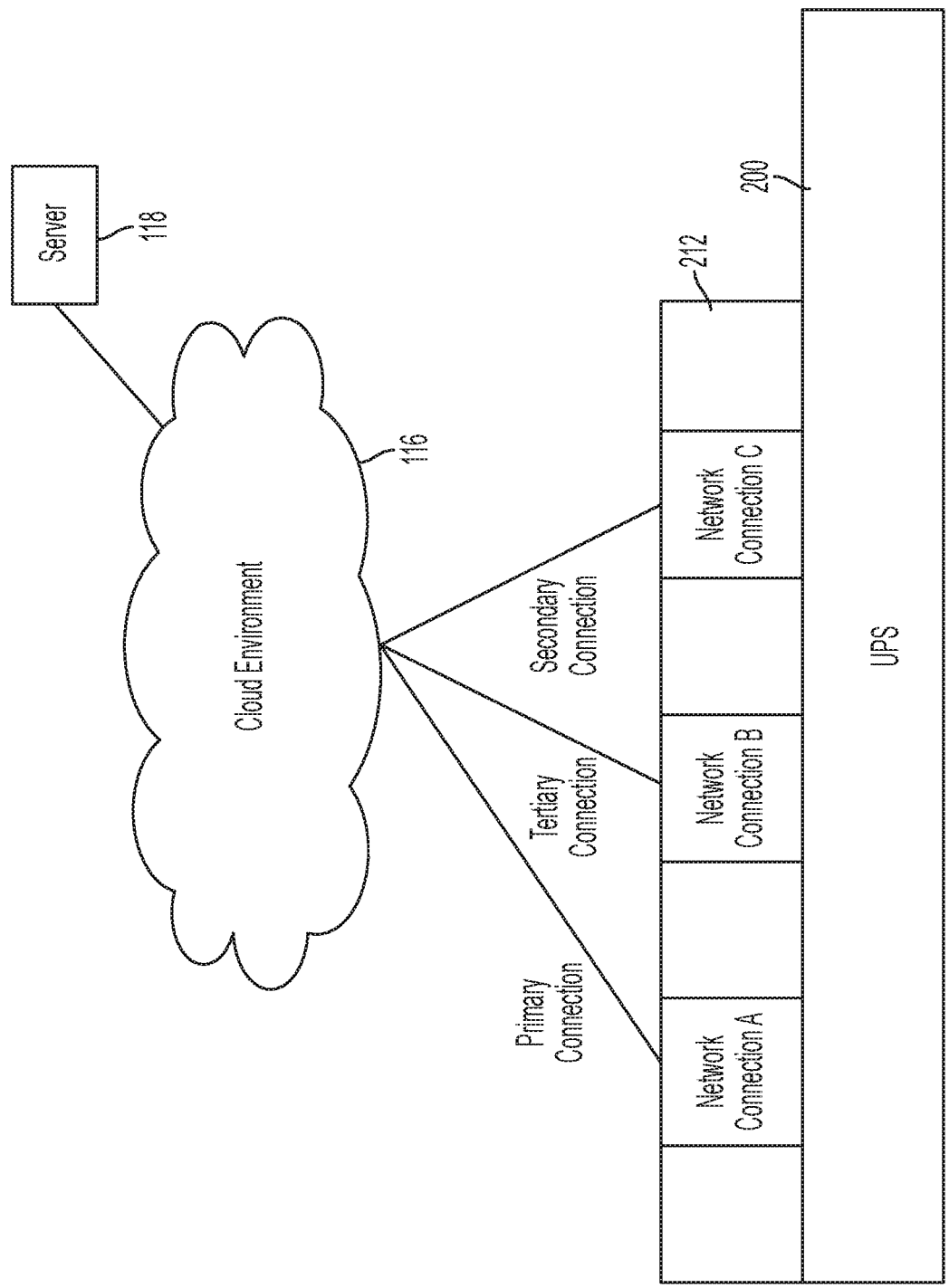
FIG. 5 is a functional block diagram of a UPS having a network interface with resilient network connectivity communicating with a device in accordance with one embodiment of the present invention.

In one embodiment, illustrated by FIG. 5, the network interface 212 holds open a network connection via the primary network by sending keep-alive messages every 10 seconds. In other embodiments the keep-alive messages may be sent using any other time interval. When the network interface 212 attempts to communicate with the network 116 to publish data to the server 118, it first checks if the primary network connection "A" is available, and if so, publishes the data. If the primary network connection "A" is determined to be unavailable or unstable, a new network connection is opened via the secondary network and the secondary network connection "B" is used if available. The network interface will check possible network connections until an available network is found or all possible networks have been checked.

Figure 6:
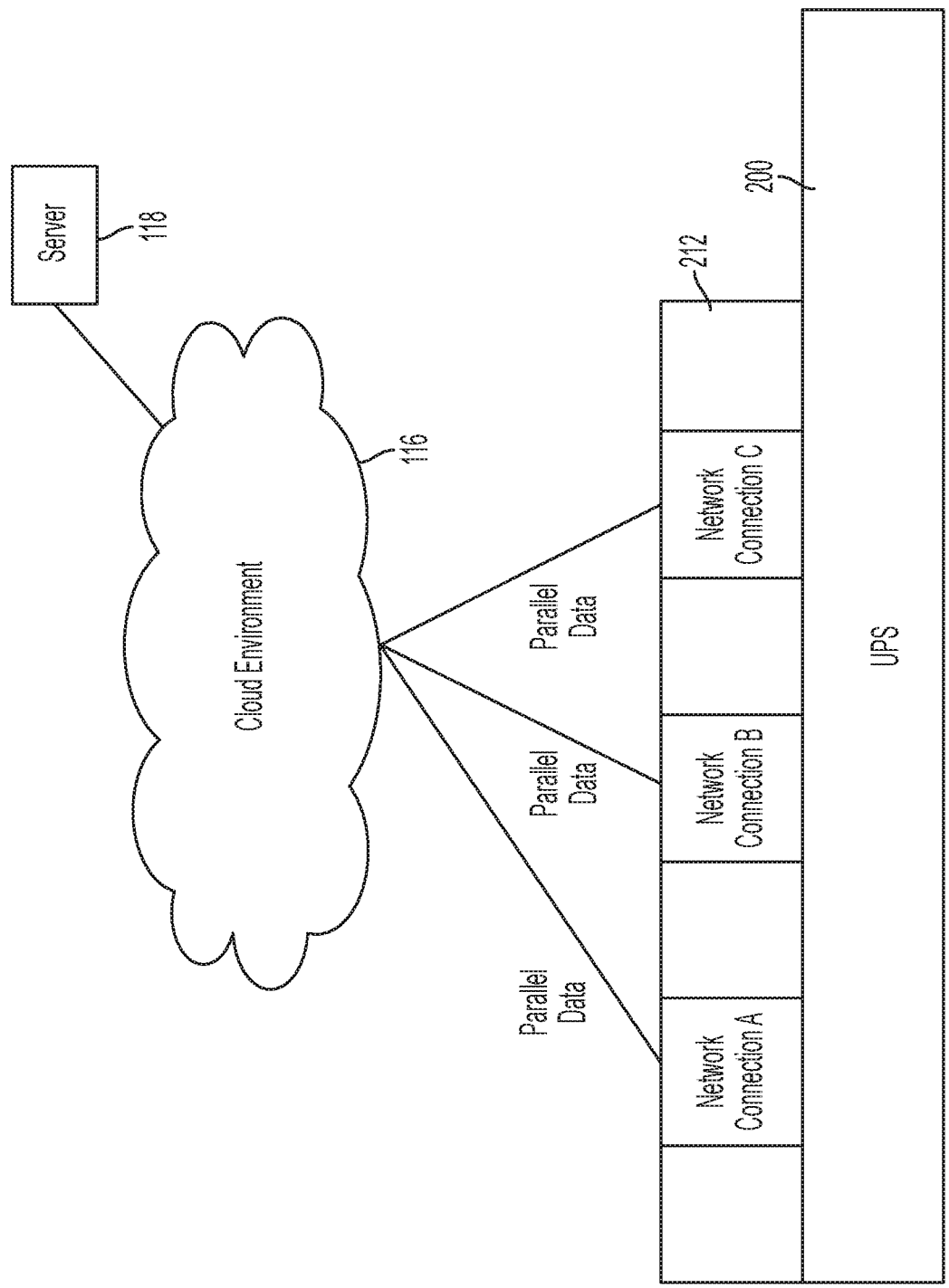
FIG. 6 is a functional block diagram of a UPS having a network interface with resilient network connectivity communicating with a device in accordance with one embodiment of the present invention.

In another embodiment, illustrated by FIG. 6, the network interface 212 holds open a network connection via the primary network using the keep-alive mechanism. While holding open the network connection on the primary network, the network interface 212 opens new network connections across all other networks using the same keep-alive mechanism. For example, the network interface may be configured to open network connections across the primary, secondary, etc. networks in parallel. When the network interface 212 attempts to communicate with the network 116 to publish data to the server 118, it first checks which of the parallel network connections are available. If the primary network connection "A" is available, it is used to publish the data. If the primary network connection "A" is determined to be unavailable or unstable, the secondary network connection "B" is used if available and so on. The availability of each network connection is determined by running the keep-alive mechanism for each network connection in the background, and an availability state for each network connection is stored by the network interface 212. In one embodiment, the network interface 212 notifies the user if secondary network connections "B" or "C" are determined to be unavailable or unstable while the primary network connection "A" is available. In some embodiments, the network interface 212 may notify the server 118 if a secondary network connection is determined to be unavailable or unstable.

In at least one embodiment, the network interface 212 may send information across any of the network connections to identify, to the server 118, the type of connection (e.g., Ethernet, Wi-Fi, etc.) and the assigned preference of the connection primary, secondary, etc.) being used at any given time.

In some embodiments, when the server 118 attempts to send a command to the UPS 200, it first checks if a keep-alive message was received from the primary network connection "A" during the previous 15 seconds. In other embodiments, the UPS 200 may check for received keep-alive messages during any other length of time. If the server 118 determines that a keep-alive message was received, then the primary network connection "A" is determined to be active and is used to send the command. If the primary network connection "A" is determined to be unavailable or unstable, the secondary network connection "B" is checked for availability and so on. When an active connection is found, the server 118 sends the command and waits for a response. In one embodiment, if no response is received within 10 seconds then the server 118 sends the same command using the next preferred network connection. In other embodiments, the server 118 may be configured to wait for a response for any other length of time. If none of the network connections are determined to be available, the server 118 deems the UPS to be disconnected.

In one embodiment, the server 118 may be configured to send alerts or notifications relating to network status and UPS status. For example, the server 118 may send an alert to a user when there are issues with the network connection between the UPS 200 and the server 118. In some embodiments, the server 118 may send an alert to the user based on a change in network status of any network connection; i.e., primary, secondary, etc. In other embodiments, the server 118 may send an alert when an event occurs relating to UPS 200. For example, the server 118 may send an alert to a user if there are issues with the UPS 200 such as loss of utility power, low battery runtime, battery disconnection, etc. In one embodiment, the alerts or notifications sent by the sever 118 may be configurable by a user.

Figure 7:
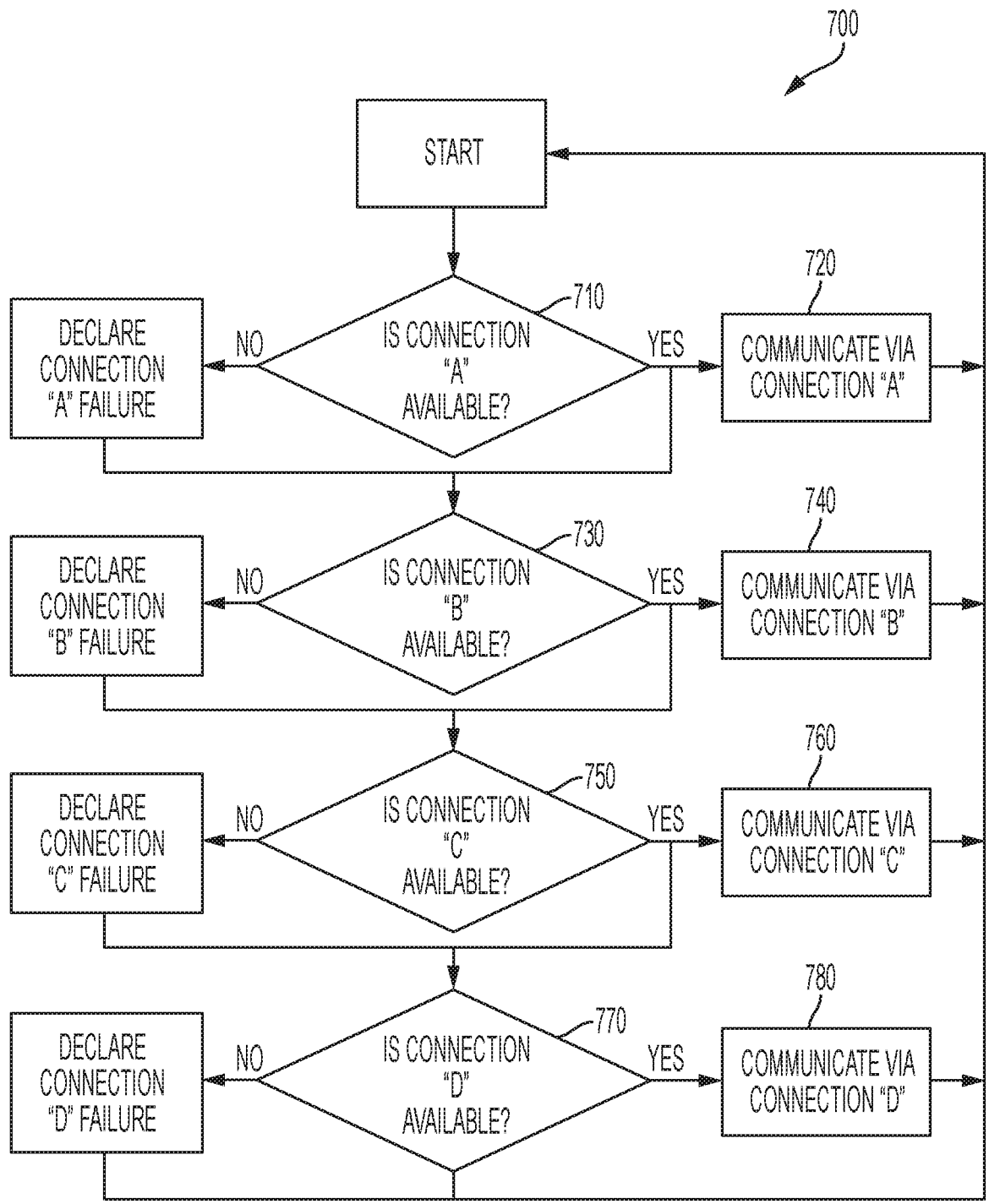
FIG. 7 is a flow chart illustrating one embodiment of a control process for a UPS communicating with a device.

FIG. 7 illustrates an example method 700 that may be implemented in a network interface 212 to manage multiple network connections in accord with aspects and embodiments herein. In the example method 700, the network interface 212 may monitor whether a first network connection "A" is available (block 710) and if so, may use network connection "A" to communicate with the network 116 (block 720). If the first network connection "A" is not available, the network interface 212 may declare a connectivity failure for network connection "A." In parallel, the network interface 212 may monitor whether a second network connection "B" is available (block 730) and if so, use the network connection "B" to communicate with the network 116 (block 740). If the second network connection "B" is not available, the network interface 212 may declare a connectivity failure for network connection "B." Also in parallel, the network interface 212 may monitor whether a third network connection "C" is available (block 750) and if so, may use the network connection "C" to communicate with the network 116 (block 760). If the third network connection "C" is not available, the network interface 212 may declare a connectivity failure for the network connection "C". Additionally, in parallel, the network interface 212 may monitor whether a fourth network connection "D" is available (block 770) and if so, use the network connection "D" to communicate with the network 116 (block 780). If the fourth network connection "D" is not available, the network interface 212 may declare a connectivity failure for network connection "D." If each of the parallel network connections "A," "B," "C," and "D" is not available, the network interface, 212 may declare a connectivity failure and return to monitoring "A," "B," "C," and "D," e.g., at intervals, with optional delays, counters, timeouts, max iterations, etc.

In some embodiments, the network connections "A," "B," "C," and "D," may correspond to network connections such as 214a, 214b, and 214c, and sub-interfaces such as 216a, 216b, and 216c. In other embodiments, the network connections "A," "B," "C," and "D," along with their corresponding preference/priority may be pre-configured in a different manner, may be user configurable, and/or may be dynamically configured or assigned to the various sub-interfaces 216 (and accordant network connections 214). For example, a network connection type may be detected and a preference or priority of one network connection over another may be assigned based upon the type. In some embodiments, data may be organized in sets and each set may be assigned to a specific network connection and sub-interface, respectively. For example, data sets may be pre-configured or configurable by a user based on cost and security factors, among numerous other factors. Various embodiments may include more or fewer connections with varying orders of preference.

Figure 8:
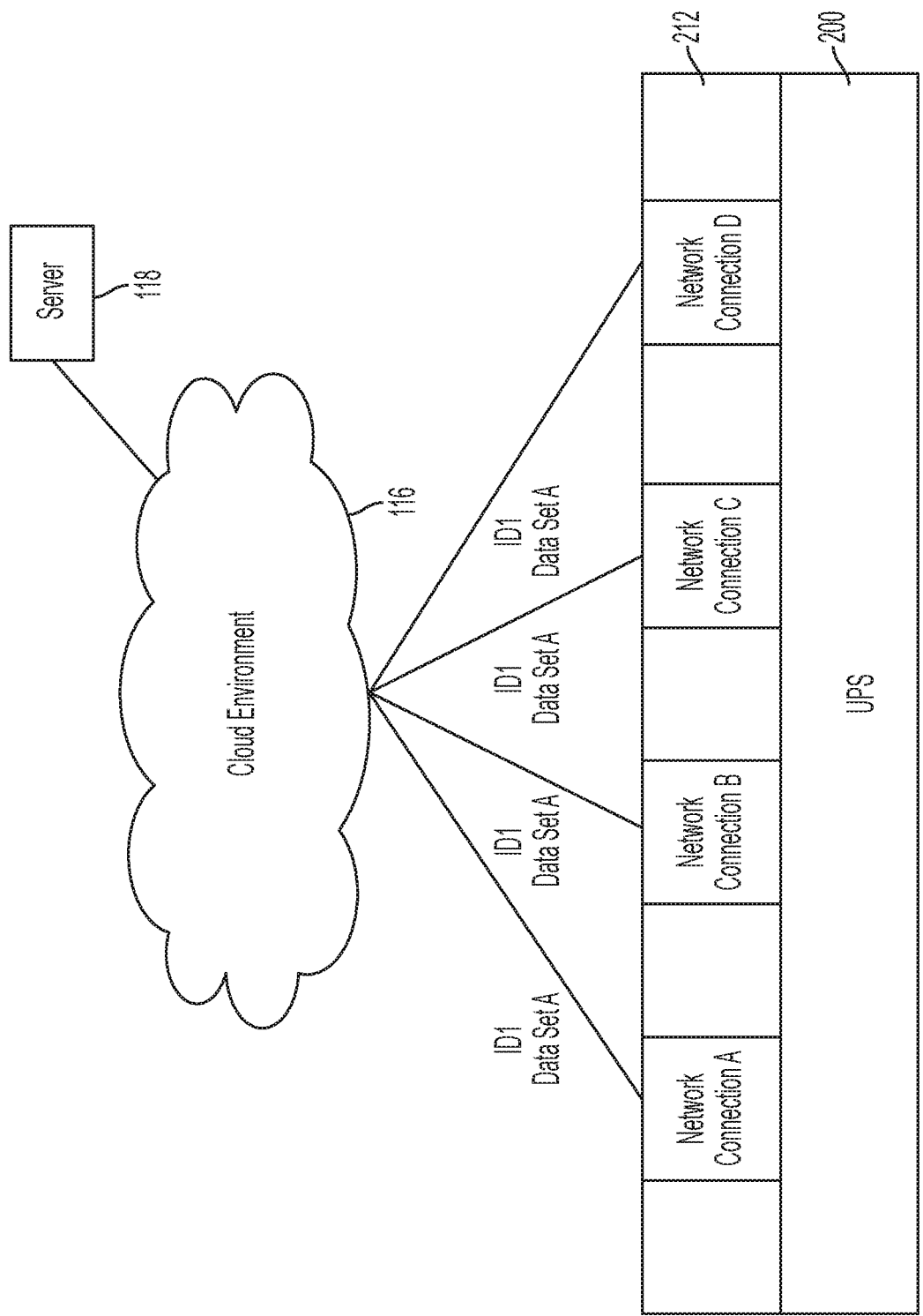
FIG. 8 is a functional block diagram of a UPS having a network interface with resilient network connectivity communicating with a device in accordance with one embodiment of the present invention.

In one embodiment, as illustrated in FIG. 8, the network interface 212 holds open a network connection via a first network using the keep-alive mechanism. While holding open the network connection on the first network, the network interface 212 opens new network connections across all other networks using the same keep-alive mechanism. When the network interface 212 attempts to communicate with the network 116 to publish data to the server 118, it tags the data with a unique ID and attempts to send the data notification across each of the available parallel network connections. When the server 118 receives data, the notification ID is inspected and if the server 118 has already received and processed a data notification having the same notification ID, the data notification is ignored. If the server 118 has not processed a data notification having the same notification ID, it records that the notification ID has been processed and then processes the data notification to avoid duplication. Likewise, when the server 118 attempts to send a command to the UPS 200, it tags the command with a unique ID and attempts to send the command across each of the available parallel network connections. When the network interface 212 receives a command from the server 118, the command ID is inspected and if the network interface 212 has already received and processed a command having the same command ID, the command is ignored. If the network interface 212 has not processed a command having the same command ID, the command ID is recorded and then performs the command to avoid duplication.

FIG. 9A illustrates example data sets assigned to network connections "A," "B," "C," and "D." In one embodiment, the data sets are assigned to network connections based upon cost factors relating to ISP rates, transmission time, processing power, etc. associated with each network connection. In other embodiments, the data sets are assigned to network connections based upon security factors such as network untrusted statuses and the type of encryption being used to protect data. In some embodiment, the preference/priority of connections "A," "B," "C," and "D," may be pre-configured, configured by a user, and/or dynamically configured based on various cost and/or security factors. In at least one embodiment, the same data may be included in multiple data sets. For example, data set "A" may include at least the same data as data sets "B," "C," and "D," data set "B" may include at least the same data as data sets "C" and "D," and so on.

Figure 9B:
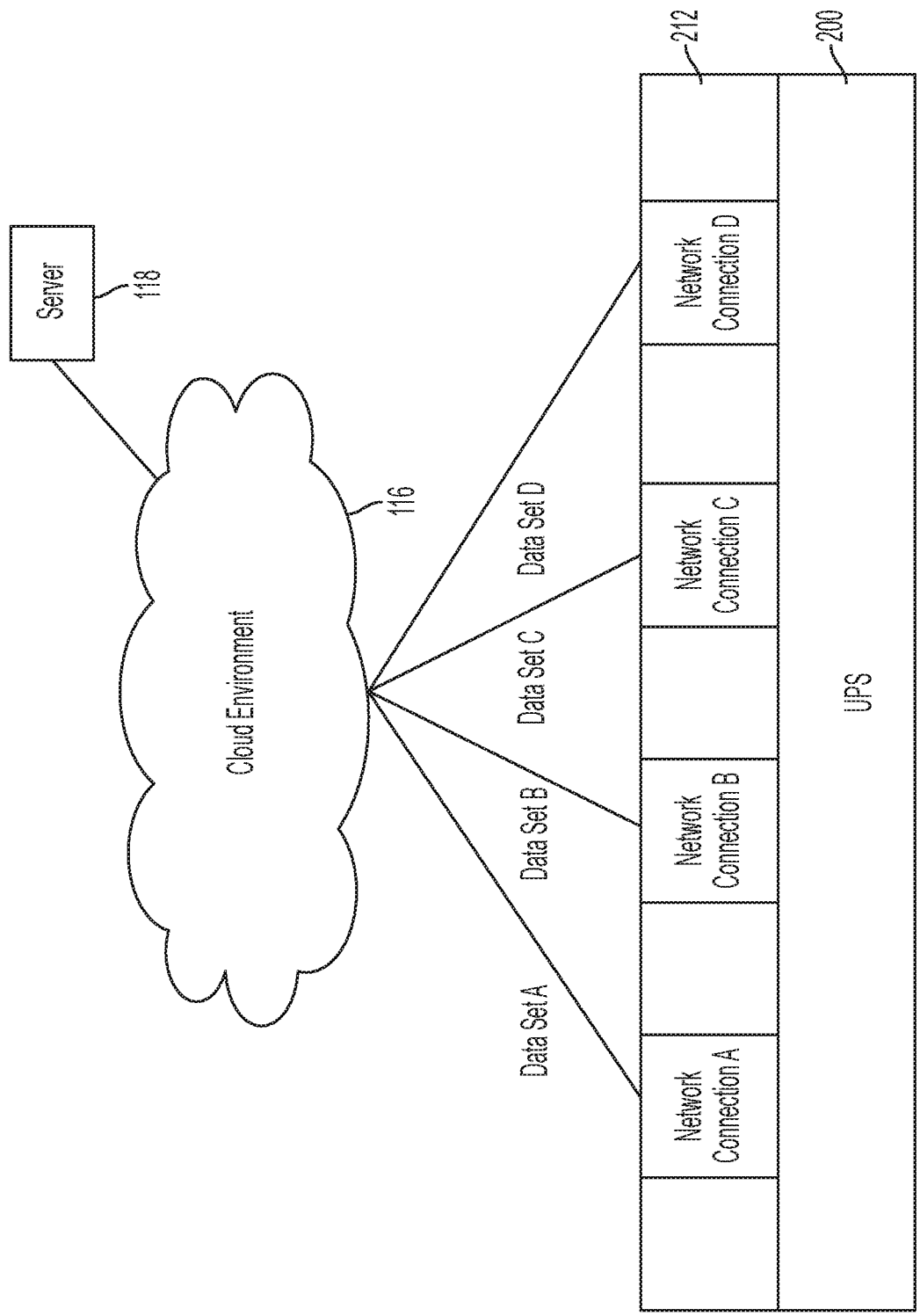
FIG. 9B is a functional block diagram of a UPS having a network interface with resilient network connectivity communicating with a device in accordance with one embodiment of the present invention.

In one embodiment, as illustrated in FIG. 9B, the network interface 212 holds open a network connection via a first network using the keep-alive mechanism. While holding open the network connection on the first network, the network interface 212 opens new network connections across all other networks using the same keep-alive mechanism. In one embodiment, when the network interface 212 attempts to communicate with the network 116 to publish data to the server 118, it attempts to send the data using the network connection assigned to the corresponding data set. In another embodiment, when the network interface 212 attempts to communicate with the network 116 to publish data to the server 118, it attempts to send the data using each network connection capable of sending the data. For example, if the data to be sent corresponds to data set "B," the network interface may first attempt to determine if network connection "A" is active, and if so, use network connection "A" to publish the data. If the network connection "A" is determined to be unavailable or unstable, then network connection "B" is checked for availability, and if so, is used to publish the data.

In various embodiments, the network interface 212 may be a network interface card (NIC), or adapter, that provides two or more network sub-interfaces, monitors connectivity to a management system and/or a user interface through each of the sub-interfaces, and provides network communication through a most preferred one of the sub-interfaces that has reliable network connectivity at any given time, without requiring the controller 110 to be configured for support of multiple sub-interfaces. For example, a network interface card slot in a UPS may accommodate a network card through which a controller (or the UPS generally) communicates with a management system or user interface, and network card systems and method in accord with aspects and embodiments herein may provide resilient network connectivity via two or more sub-interfaces without awareness by the controller (e.g., without re-configuration, updating of firmware, etc. of the controller). Network interface cards implemented in accordance with embodiments discussed herein may be used with a number of different devices, in addition to UPSs to provide resiliency in network connections.

Figure 10:
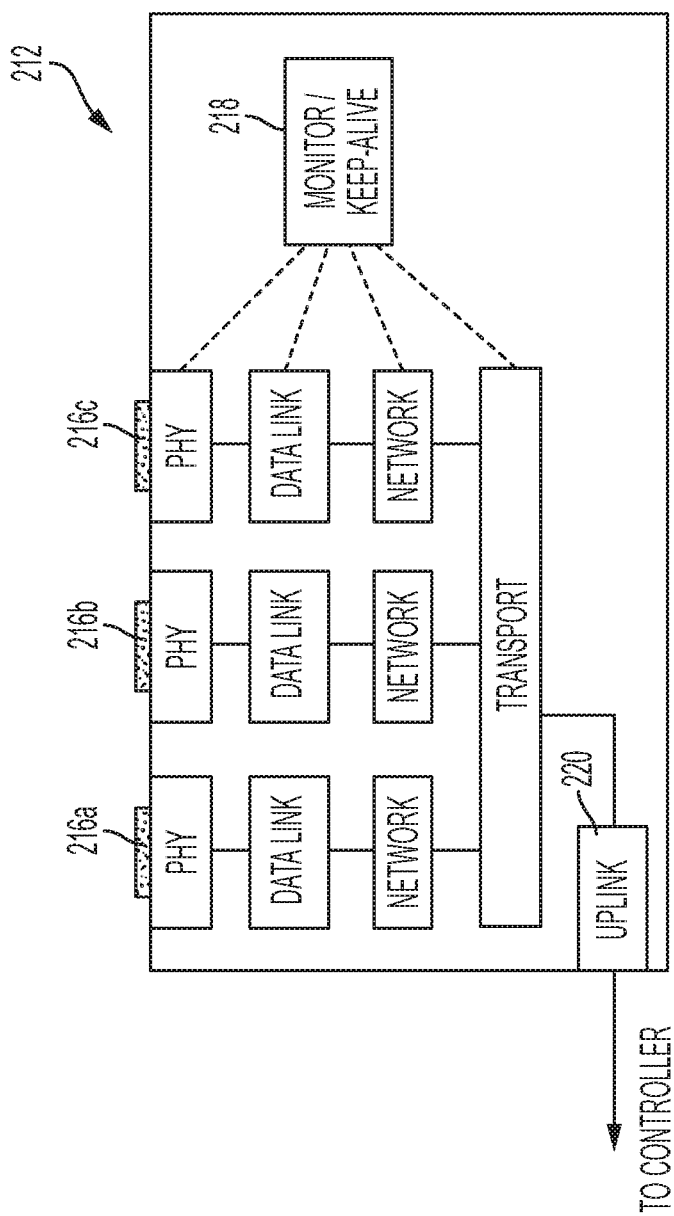
FIG. 10 is a block diagram of an example network interface with resilient network connectivity for a UPS.

For example, with reference to FIG. 10, an example network interface 212 is shown as a modular component, which may be user insertable and removable in a UPS, or may be provided as an optional peripheral, such as installed at a time of manufacture and/or provided as a removable, e.g., card in a peripheral slot. The network interface 212 may be any of various physical forms, and may include a printed circuit board or the like and various electrical components, semiconductors, chips, etc., which may include firmware or software that includes instructions for the operation of the network interface 212. As shown in FIG. 10 and as described above, the network interface 212 provides multiple sub-interfaces 216 (e.g., three in this example), each of which may have a physical layer that may include hardware connectors and supporting circuitry to transmit and receive signals via wired or wireless means. Higher layers may be supported by the network interface 212, such as data link, network, and transport layers. An interface monitor 218 monitors connection availability, as described above, and in various embodiments may use various of the protocol layers to do so. Certain embodiments may maintain a single uplink interface 220 to a controller, such as the controller 110. In some embodiments, the uplink interface 220 may be a local device interface. In various embodiments, one or more protocol layer functions may be performed by the controller rather than the network interface 212.

In other embodiments, a controller of a UPS may be configured for more integration with the network interface 212, e.g., to manage multiple network sub-interfaces or to manage multiple network cards to provide similar functionality as the network interface 212 as described above, e.g., to monitor connectivity via multiple connections and communicate via a most preferred one having reliable connectivity. Accordingly, in various embodiments, a combined functionality as variously described above, of the controller 110 and the network interface 212, may be provided by various combinations or functional assignments between a controller and one or more network interfaces. In some embodiments, the controller 110 and/or the one or more network interfaces (e.g., network interface 212) may include one or more processors assigned to perform various functions. In some embodiments, one or more controllers (e.g., controller 110) may determine whether a preferred network interface has connectivity to one or more networks.

Figure 11:
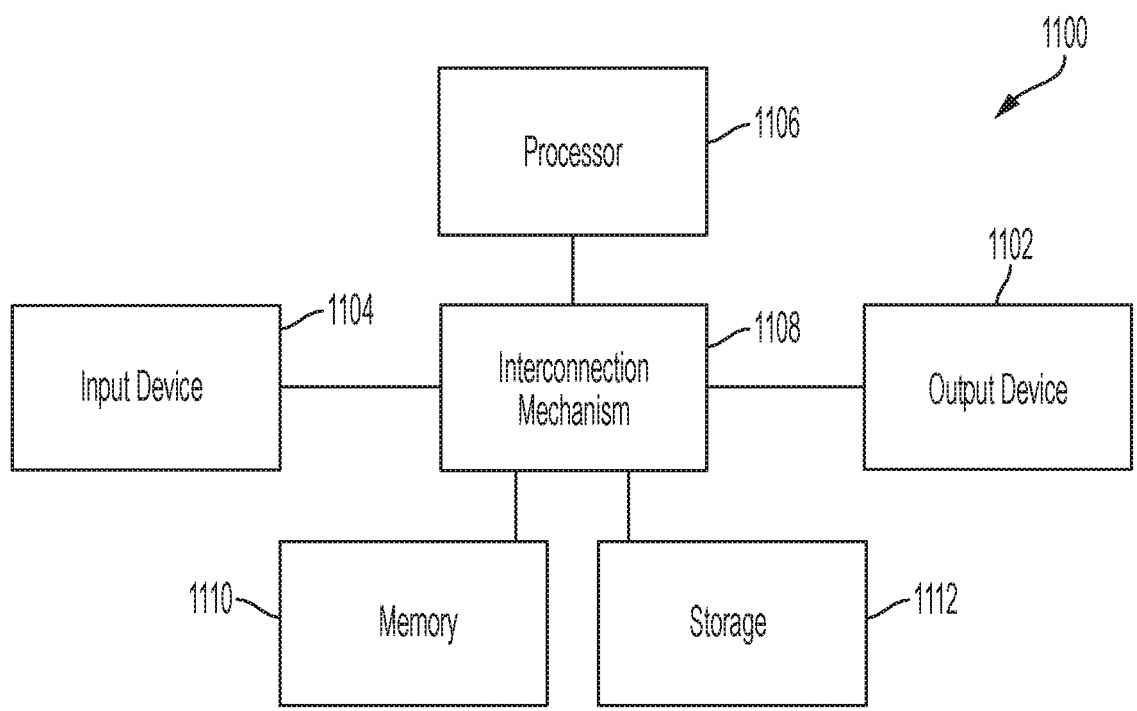
FIG. 11 is an example block diagram of computing components forming a system which may be configured to implement one or more aspects disclosed herein.

FIG. 11 illustrates an example block diagram of computing components forming a computing system 1100 which may be configured to implement one or more aspects disclosed herein. For example, the controller 110 and/or network interface 212 may include a computing system 1100, or a computing system 1100 may be included in a UPS, e.g., UPS 200, to provide the function of a controller and/or one or more network interfaces, to allow communications to an operator, management system, and/or other devices.

The computing system 1100 may include for example a computing platform such as those based on general computing processors, specialized processors, or microcontrollers. Computing system 1100 may include specially-programmed, special-purpose hardware, for example, an application-specific integrated circuit (ASIC), or more generally designed hardware, such as a field programmable gate array (FPGA) or a general purpose processor. Additionally, various aspects of the present disclosure may be implemented as specialized software executing on a computing system 1100 such as that shown in FIG. 11.

The computing system 1100 may include a processor/ASIC 1106 connected to one or more memory devices 1110, such as a disk drive, memory, flash memory, embedded or on-chip memory, or other device for storing data. Memory 1110 may be used for storing programs and data during operation of the computing system 1100. Components of the computing system 1100 may be coupled by an interconnection mechanism 1108, which may include one or more buses and/or a network. The interconnection mechanism 1108 enables communication of, e.g., data and instructions, to be exchanged between components of the computing system 1100. The computing system 1100 may also include one or more input devices 1104, which may include, for example, a keyboard, a mouse, a touch screen, and the like. The computing system 1100 may also include one or more output devices 1102, which may include, for example, a display, a buzzer, alarm, or other audio indicator, a light, or other visual indicator, and the like. In addition, the computing system 1100 may contain one or more interfaces (not shown) that may connect the computing system 1100 to a communication network.

The computing system 1100 may include a storage component 1112, which may include a computer readable and/or writeable nonvolatile medium in which signals may be stored to provide a program to be executed by the processor/ASIC 1106 or to provide information stored on or in the medium to be processed by the program. The medium may, for example, be a disk or flash memory or other non-volatile memory including programmable read-only memory (PROM) of various types, and in some examples may include random access memory (RAM).

In some embodiments, the processor may cause data to be read from the nonvolatile medium into another memory 1110 that allows for faster access to the information by the processor/ASIC 1106 than does the medium. This memory 1110 may be a volatile, random access memory such as a dynamic random access memory (DRAM) or static memory (SRAM). It may be located in storage component 1112 or in memory 1110. The processor/ASIC 1106 may manipulate the data within the memory 1110 and copy the data to the storage 1112 after processing is completed. Either or both of the memory 1110 and storage 1112 may be integrated in the processor/ASIC 1106.

The computing system 1100 may include a computer platform that is programmable using a high-level computer programming language. The computing system 1100 may also be implemented using specially programmed or special purpose hardware, e.g. an ASIC. The processor/ASIC 1106 may execute a core low-level operating system and may also execute a high-level operating system, and may include bare metal and/or virtual systems.

In certain embodiments, a UPS has a controller in accord with aspects and embodiments disclosed herein and the controller may include a processor, which may be any of the above or other suitable processors, including ASICs, and may run an instruction set or operate upon other logic, to implement control of the UPS components as discussed above.

Some embodiments of UPS methods and systems, in accord with the aspects and embodiments disclosed herein, may provide single phase power or three phase power, and may receive input power in single phase or three phase from any of the various power inputs, or any combination thereof. Embodiments disclosed herein can provide uninterruptible power to critical loads and/or to a utility grid using multiple power sources, including energy storage, renewable energy sources, and non-renewable energy sources. Conventional and modern sources, and future energy sources, may be accommodated in various embodiments.

In certain embodiments, a converter such as the converter 104 may be or may include a power factor correction (PFC) circuit, and may aggregate power from one energy source at a time or may controllably aggregate power from multiple power sources, and may provide power to one or more energy outputs. Additionally, converter 104 may include power interfaces capable of both receiving and providing power, such as, for example, the input 102 may receive AC power but may also act as a power output when, e.g., the converter 104 converts excess renewable or stored energy to feed power back to a utility grid.

UPS systems and methods in accord with those disclosed herein can increase availability and runtime, especially in conditions of one or more network outages, by providing resilient network connectivity as described above. Further, while the UPS 100 shown in FIG. 1 is an online UPS, certain embodiments may be directed to other types of uninterruptible power supplies, including any of an offline UPS, a line interactive UPS, or any other type of UPS. Embodiments may also include devices other than uninterruptible power supplies, including power distribution units, environmental control systems such as heating, ventilation, and air conditioning (HVAC) systems, and other types of managed devices having network connectivity.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
a first input configured to receive input power;
a second input configured to receive backup power;
an output configured to provide output power to a load;
power circuitry coupled to the first input, the second input and the output, and configured to provide the output power derived from at least one of the input power or the backup power;
a plurality of network interfaces;
one or more controllers coupled to the power circuitry and the plurality of network interfaces;
one or more controllers configured to direct communication over the network via a preferred network interface in response to a determination that the preferred network interface does have connectivity to the network;
one or more controllers configured to direct communication over the network via an alternate one of the plurality of network interfaces in response to a determination that the preferred network interface does not have connectivity to the network; and
one or more controllers configured to direct communication over the network via a second alternate one of the plurality of network interfaces in response to a determination that the preferred network interface does not have connectivity to the network and the alternate one of the plurality of network interfaces does not have connectivity to the network.

2. The uninterruptible power supply of claim 1 wherein at least one controller is configured to determine connectivity to the network by attempting to communicate with a management device.

3. The uninterruptible power supply of claim 2 wherein at least one controller is configured to determine connectivity to the network via one or more alternate network interfaces of the plurality of network interfaces while directing communication over the network via the preferred network interface.

4. The uninterruptible power supply of claim 1 wherein at least one controller is configured to determine connectivity to the network by intervally sending keep-alive messages to a management device.

5. The uninterruptible power supply of claim 1 wherein at least one controller is configured to detect a type of network connection coupled to one or more of the plurality of network interfaces and to determine the preferred network interface based upon the type of network connection.

6. The uninterruptible power supply of claim 5 wherein at least one controller is configured to determine the preferred network interface based upon an ordered list including a wired connection, a wireless connection to a local area network, and a wireless connection to a cellular network.

7. The uninterruptible power supply of claim 1 wherein at least one controller is configured to disallow a set of remote management capabilities based upon an untrusted status of one of the plurality of network interfaces the at least one controller uses to communicate with the network.

8. The uninterruptible power supply of claim 7 wherein the at least one controller is configured to determine an untrusted status of the one of the plurality of network interfaces based upon at least one of a detected type of network connection coupled to the one of the plurality of network interfaces, a user-configured type of network connection coupled to the one of the plurality of network interfaces, or a user-configured untrusted status of the one of the plurality of network interfaces.

9. The uninterruptible power supply of claim 1 wherein at least one controller is configured to accept a user configuration identifying at least one of a preferred network interface or a preferred type of network connection coupled to one or more of the plurality of network interfaces.

10. A network interface adapter comprising:
a first sub-interface configured to be coupled to a first network connection;
a second sub-interface configured to be coupled to a second network connection;
a local device interface configured to be coupled to a power controller;
a processor configured to determine whether the first sub-interface has connectivity to a remote device, to provide communications between the power controller and the remote device via the first sub-interface in response to a determination that the first sub-interface does have connectivity to the remote device, to determine whether the second sub-interface has connectivity to a remote device, and to provide communications between the power controller and the remote device via the second sub-interface in response to a determination that the first sub-interface does not have connectivity to the remote device and that the second sub-interface does have connectivity to the remote device; and
a third sub-interface configured to be coupled to a third network connection, the processor being further configured to associate a preference with each of the first sub-interface, the second sub-interface, and the third sub-interface, and to provide communications between the power controller and the remote device via a highest preferred one of the sub-interfaces that has connectivity to the remote device;
wherein the processor is configured to determine whether the second sub-interface and the third sub-interface have connectivity to the remote device while communicating with the remote device via the first sub-network.

11. The network interface adapter of claim 10, wherein the processor is further configured to:
associate a first preference with the first sub-interface; and
associate a second preference with the second sub-interface, wherein the first preference is more preferred than the second preference.

12. The network interface adapter of claim 10 wherein the processor is further configured to detect a type of network connection coupled to one or more of the sub-interfaces and to associate the preference based upon the type of network connection.

13. The network interface adapter of claim 10 wherein the processor is configured to disallow a set of remote management capabilities in response to a determination that the first sub-interface does not have connectivity to the remote device.

14. The network interface adapter of claim 10 wherein the processor is further configured to accept a user configuration including at least one of identifying which sub-interface is the first sub-interface, associating a preference with any of the sub-interfaces, identifying a type of network connection coupled to any of the sub-interfaces, associating a cost of use of any of the sub-interfaces, or establishing a trusted status of any of the sub-interfaces.

15. A non-transitory computer-readable medium storing thereon sequences of computer-executable instructions for providing communication between a power unit and a management device, the sequences of computer-executable instructions including instructions that instruct at least one processor to:
determine whether a first network interface has connectivity to the management device;
communicate with the management device via the first network interface in response to a determination that the first network interface does have connectivity to the management device;
determine whether a second network interface has connectivity to the management device;
communicate with the management device via the second network interface in response to a determination that the first network interface does not have connectivity to the management device and that the second network interface does have connectivity to the management device;
determine whether a third network interface has connectivity to the management device, and communicate with the management device via the third network interface in response to a determination that each of the first network interface and the second network interface does not have connectivity to the management device and the third network interface does have connectivity to the management device.

16. The non-transitory computer-readable medium of claim 15, wherein the instructions are further configured to instruct the at least one processor to:
determine a type of network connection coupled to each network interface and identify the first network interface and the second network interface based upon the type of network connection.

17. The non-transitory computer-readable medium of claim 16, wherein in identifying the first network interface and the second network interface based upon the type of network connection, the instructions further instruct the at least one processor to:
identify a wired network connection as the first network interface over a wireless network connection as a second network interface and identify a shorter range wireless network connection as the first network interface over a longer range wireless network connection as a second network interface.

18. The non-transitory computer-readable medium of claim 15, wherein the instructions are further configured to instruct the at least one processor to:
alert a user in response to a determination that one or more of the first, second, and third network interfaces does not have connectivity to the management device.

19. A method of providing communication between a power unit and a management device, the method comprising:
removing a first network adapter from the power unit;
installing a second network adapter to the power unit, the second network adapter having a first network interface, a second network interface and a third network interface; and the second network adapter configured to monitor the first, second and third network interfaces for connectivity to the management device and to use a highest priority one of the first, second and third network interfaces determined to have connectivity to the management device for communications with the management device;

coupling the first network interface to a first network connection; and coupling the second network interface to a second network connection;

coupling the third network interface to a third network connection in response to a determination that the first network interface and the second network interface do not have connectivity to the management device.

* * * * *